United States Patent [19]
Wani

[11] Patent Number: 5,682,288
[45] Date of Patent: Oct. 28, 1997

[54] ELECTRIC DOUBLE-LAYER CAPACITOR AND METHOD FOR MAKING THE SAME

[75] Inventor: Takayuki Wani, Okayama, Japan

[73] Assignee: Japan Gore-Tex, Inc., Tokyo, Japan

[21] Appl. No.: 550,849

[22] Filed: Oct. 31, 1995

[30] Foreign Application Priority Data

Nov. 2, 1994 [JP] Japan .................. 6-269641

[51] Int. Cl.$^6$ .................. H01G 9/00; H01M 2/08; H01M 2/00; H01M 2/16
[52] U.S. Cl. .................. 361/502; 29/25.03; 429/34; 429/36; 429/163; 429/185; 429/209; 429/212; 429/218; 429/232; 429/247; 429/248
[58] Field of Search .................. 361/502–503, 361/508, 512, 517–519, 523, 528, 535–537; 29/25.03; 429/34–36, 163, 175–176, 185, 209, 212, 218, 232, 247–248

[56] References Cited

U.S. PATENT DOCUMENTS 4,862,328  8/1989  Morimoto et al. .................. 361/502

FOREIGN PATENT DOCUMENTS 3-152916  6/1991  Japan .

Primary Examiner—Bot L. Ledynh
Attorney, Agent, or Firm—Gary A. Samuels

[57] ABSTRACT

The invention provides an improved double-layer capacitor in which the improvement is a planar layered electrode assembly which has low electrical resistance and which has high electric storage capacity. The electrode material is produced by a process in which acicular electrically-conductive particles are blended with a binder, oriented by extrusion, and cut to form planar electrode discs or plates in which the acicular particles are oriented as nearly perpendicular as possible to the flat surfaces of the electrode.

17 Claims, 1 Drawing Sheet

ELECTRIC DOUBLE-LAYER CAPACITOR AND METHOD FOR MAKING THE SAME

FIELD OF THE INVENTION

The invention relates to an electric capacitor, more specifically, to a double-layer capacitor having an electrode assembly of flat parallel layers; and to a process for making the electrode.

BACKGROUND OF THE INVENTION

In recent years, the need for back-up power sources for electronic devices, in particular, semiconductor memories in electronic devices, has become increasingly important. High capacitance electric capacitors are being widely used for this purpose and the double-layer capacitor, because it combines large electrical capacity and small device size, has become increasingly popular.

Small button-type double-layer capacitors having two electrically-conductive electrodes impregnated with an electrolyte and separated by an ion permeable material are known in the art. In one such capacitor the electrode material is activated carbon fiber cloth. In this type the pore volume of the electrode material is high, there is little contact between the fibers, and contact resistance is high. In another type, chopped fibers of activated carbon are mixed with a fluoropolymer and a conductivity enhancing material and molded or pressed into sheet-form to serve as the electrodes. This type of electrode material also had electrical resistance higher than desirable for the purpose.

In Japanese Laid-Open Patent Application No. 3-152916 is disclosed an electrode material in which activated carbon fibers are used and in which the fibers are all aligned in the same direction. The fibers are bundled together in the longitudinal direction and formed into a cylinder held together with a polymeric binder. The cylinder is cut perpendicular to its longitudinal axis to form electrode discs containing activated carbon fibers oriented perpendicular to the planar surfaces. The electrode discs are mounted in the capacitor with the fiber ends in contact with current-collecting plates. Such electrode discs provide relatively low electrical resistance, however, they are both difficult and expensive to make.

Japanese Laid-Open Patent Application No. 63-107011 discloses an electrode material for double-layer capacitors made of discs stamped from a sheet formed of a mixture of particles of activated carbon, carbon black, and polytetrafluoroethylene. This type of electrode material requires an increased polytetrafluoroethylene binder content to develop adequate strength and, consequently, also has electrical resistance higher than desirable for the purpose.

SUMMARY OF THE INVENTION

The present invention provides an improved double-layer capacitor in which the improvement is a planar layered electrode assembly which has low electrical resistance in the direction normal to the planar direction of the assembly (thickness direction), and which has high electric storage capacity. The electrode material is easily and inexpensively produced by a process in which acicular electrically-conductive particles are blended with a binder, oriented by extrusion means, and cut to form planar electrode discs or plates in which the acicular particles are oriented as nearly perpendicular as possible to the flat surfaces of the electrode.

A planar article or form, as used herein, is an essentially flat article or form having length and width dimensions, or radial dimensions, much greater than the thickness dimension.

By porous, as used herein, is meant a structure defining interconnected passages and pathways throughout a material.

The improved double-layer capacitor consists of an open-top casing in which is disposed a porous layered electrode assembly. The electrode assembly consists of two layers of porous electrically-conductive electrode material having between them, in contacting relationship, a layer of ion permeable material. The electrode material consists of a porous polymeric matrix containing electrically-conductive particles. One layer of the electrode material is electrically-connected to the casing; the second layer of the electrode material is electrically-connected to a casing cover. The electrode assembly is impregnated with an electrolyte. The casing cover is separated and electrically-insulated from the casing, and is also sealed to the casing, by a dielectric sealant interposed between the cover and the casing.

The invention is an improvement of the porous electrode assembly wherein each electrode material layer comprises a polytetrafluoroethylene (PTFE) binder composition containing acicular electrically-conductive particles, or a blend of acicular and non-acicular electrically-conductive particles, the particles having a size and concentration in the polytetrafluoroethylene composition whereby the acicular particles can be directionally oriented within the polytetrafluoroethylene composition, substantially in one direction, by extrusion means. The electrode material layers of the assembly have planar shapes, typically discs or plates, wherein the acicular particles are substantially oriented in the direction perpendicular to the planar direction of the electrode material layer, i.e., the acicular particles are oriented as much as possible in the thickness direction of the discs or plates.

The process for making the improved electrode of the invention comprises the steps of:

(a) mixing polytetrafluoroethylene resin together with acicular electrically-conductive particles, or with a blend of acicular and non-acicular electrically-conductive particles, to form a polytetrafluoroethylene composition;

(b) lubricating the polytetrafluoroethylene composition with a lubricant;

(c) extruding the lubricated polytetrafluoroethylene composition through a die having a tapered entry, thereby orienting the acicular particles in the extrusion direction and forming an elongated rod-shaped article;

(d) cutting the rod-shaped article in the direction normal to the direction of extrusion to form planar electrode discs or plates wherein the acicular particles are oriented in a direction approximately normal to the planar direction of the electrode material.

DETAILED DESCRIPTION OF THE INVENTION

Figure 1:
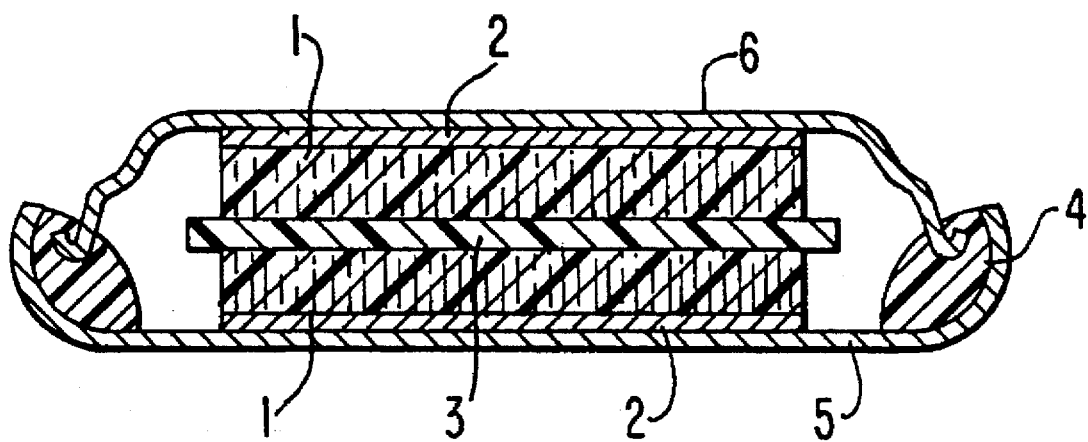
FIG. 1 is a cross-sectional view of a button-type double-layer capacitor which incorporates the improved electrode of the invention.

With reference to FIG. 1 the invention will be described in detail. In FIG. 1 is shown a cross-section of a button-type double-layer capacitor. The capacitor consists of a casing 5 in which is disposed an electrode assembly. The electrode assembly consists of a planar porous electrode 1 in contact with each side of a planar porous separator 3. In contact with the surface of each electrode 1 facing away from the separator 3 is a collector layer 2 which electrically connects the electrode on one side of the assembly to the casing 5 or, on the other side of the assembly, electrically connects the electrode to the casing cover 6. The electrode assembly contains an electrolyte (not shown) in its porous structure. The casing cover 6 is held in place, spaced apart and electrically-insulated from the casing 5, by a dielectric sealant material 4 interposed between the casing 5 and casing cover 6.

The casing 5 and casing cover 6 of the capacitor of the invention can have conventional shapes and be made of conventional materials. Many variations of the types shown in FIG. 1, having circular or rectangular shapes, are known and can be used. The material should be resistant to chemical attack by the electrolyte of the capacitor and is, in most cases, a metal, such as a stainless steel or other corrosion resistant metal or alloy, to which electrical contact and connection to external circuits can be readily made. Casings and covers made of polymeric materials can also be used, for instance when an especially chemically-aggressive inorganic electrolyte is used in the capacitor. In such cases provisions are made for electrical connections through the casings and covers to external circuits by other means known in the art.

Likewise, the dielectric sealant 4 used to join and seal the cover to the casing, and to electrically insulate the cover from the casing, can be selected from among many commercially available materials. Selection is made according to the compatibility of the sealant with the electrolyte, ease of application, cost, and other considerations. Synthetic polymers, such as polyurethanes, polyolefins, fluoropolymers, and the like, can be used; as can natural rubbers, or synthetic rubbers, including silicone rubbers, fluoroelastomers, fluorosilicone rubbers, and the like, depending on the electrolyte used.

The collector layer 2 should efficiently collect the electric charge stored in the abutting electrode and effectively transmit the charge to the casing, casing cover, or connection to an external circuit. It is important that the collector have high electrical-conductivity and low contact resistance at abutting surfaces to minimize electrical losses. As with the components described above, the collector can be made of readily available commercial materials, and is likewise selected according to its compatibility with the electrolyte, ease of application, cost, etc. Suitable materials include, for example, wire mesh, metallized woven or non-woven fabrics, and the like. The collector layer 2 can also be formed of an electrically-conductive adhesive or synthetic polymer resin, in which case it can also serve to bond an electrode assembly to a casing or casing cover. The collector layer can be used on one or both sides of an electrode assembly, or can be omitted if the electrical charge can otherwise be efficiently transmitted.

The separator 3 sandwiched between the electrodes 2 can also be made of commercially available materials. Films or membranes of porous polymeric dielectric material can be used which, when coated or impregnated with an electrolyte, permit movement of ions across them. For example, porous membranes, including woven and non-woven forms, of polyethylene, polypropylene, polyethersulfone, fluoropolymers, fiberglass, and the like, can be used, and are selected according to their stability and compatibility with the electrolyte of the capacitor. Polyethersulfone, for instance, is stable in an alkaline aqueous electrolyte, but cannot be used in an acidic aqueous electrolyte. Preferably, the separator membranes are thin, 200 micrometers or less thick, more preferably in the range of 10 to 100 micrometers thick. The membrane resistance in an electrolyte should be in the range 0.1 to 2.0 ohm-cm.

The electrode 1 of the instant invention comprises a polytetrafluoroethylene composition containing acicular electrically-conductive particles, or a blend of acicular and non-acicular electrically-conductive particles. The acicular particles in the electrode material are oriented, as nearly as possible, in the direction of electric current flow into or out of the electrode to minimize the electrical path length and reduce electrical resistance to the charging or discharging current flow. Non-acicular electrically-conductive particles in the composition provide the benefit of increased surface area for electrolyte contact, which is directly related to the amount of charge which can be stored, and provide relatively short electrical pathways to and between the acicular particles for most efficient charge transfer of the capacitor.

Suitable acicular electrically-conductive particles include carbon fibers, activated carbon fibers, graphite whiskers, metal fibers, and the like. The carbon fibers and activated carbon fibers can be based on phenol, rayon, acrylic, or pitch. Suitable metal fibers can be platinum, gold, aluminum, or the like. The fiber diameters should be in the range 0.1 to 50 micrometers, and their lengths should be in the range 1 to 1000 micrometers. If the fibers are too short they are difficult to orient in one direction and, furthermore, provide a relatively long electrical path length and relatively low electrical conductivity. On the other hand, if the fibers are too long, uniform mixing and further processing is difficult. When only acicular particles are used in the polytetrafluoroethylene composition, they constitute 1 to 90, preferably 1 to 30 weight percent of the solids in the composition; the balance of the composition is polytetrafluoroethylene. When the amount of acicular particles in the composition is less than 1 weight percent, the particles provide little effect; and when added in an amount greater than 90 weight percent, processability becomes very difficult.

To improve electrical conductivity and increase electrical storage capacity, electrically-conductive non-acicular particles can be blended with the acicular particles. Suitable electrically-conductive non-acicular particles include carbon particles, activated carbon particles, and metal particles. The carbon particles are inclusive of graphite particles and carbon blacks. The activated carbon particles can be of the types described above and further include activated carbon based on coconut shell. The metal particles can be powders of the metals described above. The non-acicular particles should be highly electroconductive and provide a large amount of surface area; in the case of the carbon and activated carbon particles, the surface area should be 1000 $m^2$/gram or more. When acicular and non-acicular particles are included in the polytetrafluoroethylene composition they should be present in an amount of 5 to 97 weight percent, preferably 50 to 97 weight percent, and more preferably 70 to 95 weight percent; thus, the polytetrafluoroethylene concentration of the composition will be in the amount of 3 to 95 weight percent, preferably 3 to 50 weight percent, and more preferably 5 to 30 weight percent.

The polytetrafluoroethylene composition containing electrically-conductive acicular particles, or a blend of acicular and non-acicular electrically-conductive particles, can be formed using polytetrafluoroethylene paste-forming, or paste-extrusion, processes. In such a process, a fine powder PTFE resin is combined with electrically-conductive particles through one of two methods. In one method, fine powder PTFE resin, electrically-conductive particles, and a lubricating liquid, are blended together to form a consistent mixture. Suitable lubricants including water, alcohols, naphtha, mineral spirits, kerosene or other aliphatic hydrocarbon liquids, have been used in polytetrafluoroethylene paste-forming processes, and are known in the art. Conventional mixing methods such as rolling or tumbling can be used.

In another method, an aqueous dispersion of PTFE resin is used. The electrically-conductive particles are mixed with an aqueous dispersion of PTFE particles. The mixture is co-coagulated, i.e., the PTFE resin is coagulated in the presence of the electrically-conductive particles by rapid shearing of the aqueous dispersion, or through destabilization of the aqueous dispersion with salt, acid, polyethylene imine, or the like. A coagulum of fine powder PTFE resin and electrically-conductive particles is formed and subsequently dried. When dry, a liquid lubricant is added to the coagulum and mixed to form a consistent mixture.

The mixture produced by either of the described methods is compressed into a billet and subsequently extruded through a die by a ram-type extruder to form a coherent extrudate in the form of a rod. Subsequently the extrusion lubricant is removed from the coherent article, generally by heating or other conventional methods, for example, by passing the coherent article through a heated oven to volatilize the extrusion lubricant, thus providing a dried porous coherent article. Other well known methods, such as solvent extraction, vacuum drying, and the like, can also be used.

When the lubricated PTFE composition is extruded through a die having a tapered entry, the randomly oriented acicular particles in the composition are aligned in the direction of flow through the nozzle. Additionally, the PTFE is fibrillated by the compression shear force applied by the die, which aids in orienting the acicular particles in the extrusion direction. Standard paste extrusion dies having an entry angle in the range 10° to 900, preferably 10° to 60°, more preferably 15° to 40°, can be used. The extrusion reduction ratio should be in the range 5:1 to 150:1. To further orient the acicular particles and to increase the strength of the extruded article, the extruded article can be optionally stretched in the extrusion direction, either before or after removal of the lubricant. Stretching can be carried out at a temperature between 20° C. and 380° C., preferably between 20° C. and 200° C. The amount of stretch is preferably in the range of 1.01 to 5 times the original length of the extruded article. If desired, the extruded article, or the extruded and stretched article, can be heat treated at a temperature above the melt temperature of PTFE, preferably in the temperature range 350° C. to 390° C.

Electrodes of the present invention can be prepared from the extruded article, or from the extruded and stretched article, whether heat treated or not, by cutting the rod-shaped article in a direction normal to the extrusion direction to obtain planar slices in which the acicular particles are substantially oriented in the extrusion direction. The bulk density of the electrode material is typically about 0.3 to 1.2 g/cc, but may be more or less depending on the amount and specific gravity of the particles present in the PTFE compositions. For example, the specific gravity of platinum is 21.4 g/cc and that of carbon is about 2 g/cc. The thickness of the planar slices will vary depending on the designed capacitance of the capacitor, but will generally be about 0.1 mm to 3 mm thick. By sandwiching a separator layer 3 between two electrodes 1 an electrode assembly is formed.

There are no particular restrictions on the electrolyte used in the capacitor of the invention, and a variety of conventional electrolytes can be used. Examples of such electrolytes include those obtained by dissolving an alkali metal salt, amine salt, tetraalkylammonium salt, tetraalkylphosphonium salt, or another such electrochemically stable substance (in which perchloric acid ions, phosphorus hexafluoride ions, perfluoroakylsulfonic acid ions, boron tetrafluoride ions, or the like, serve as the counter ions) in an amount of 0.1 to 3.0 mols/liter, preferably 0.5 to 1.5 mols/liter, in propylene carbonate, γ-butyrolactone, acetonitrile, dimethylformamide, 1,2-dimethoxyethane, sulfolane, nitromethane, or other polar organic solvent. In addition, an aqueous solution electrolyte containing inorganic acid, inorganic base, or inorganic salt as a solute can be used. Of these latter, sulfuric acid, tetrafluoroboric acid, or other such acid; or potassium hydroxide or sodium hydroxide is preferable for obtaining high electrical conductivity. The electrolyte can be added to the material forming the electrode assembly at any convenient time in the process, so long as the material is free of water. Generally, the electrolyte is added to the extruded article, or to the extruded and stretched article, before cutting; or to the electrode assembly after it has been formed.

TEST METHODS

Each of the double-layer capacitors described hereinbelow was charged at a constant voltage of 2.4 volts for 30 minutes, after which it was discharged at a constant current of 1 mA, and its capacity calculated. The impedance was measured by an alternating current two-terminal method at a frequency of 1 kHz. The results are shown in Table 1.

EXAMPLE 1

A double-layer capacitor of the invention was prepared as follows:

Activated carbon fibers (Type ACC-507-15, manufactured by Nippon Kynol Co.) with an average fiber diameter of 9–11 micrometers were pulverized. The activated carbon fibers had a specific surface area of 1500 m$^2$/gram, as measured by the BET method. Fibers having a fiber length of 1 mm or less were collected and used in a PTFE composition.

A PTFE composition was prepared by first mixing 1.5 grams of the collected activated carbon fibers, 9 grams of non-acicular particles of coconut shell-based activated carbon (specific surface area—1500 m$^2$/gram), and 3 grams of acetylene black in 100 grams of 2-propyl alcohol. The mixture was stirred for one hour using a HEIDON agitator (HEIDON Three-One Motor 600G). An aqueous dispersion of PTFE resin (D-1 Dispersion, manufactured by Daikin Co.) was added to the mixture, in an amount such that 1.5 grams of PTFE solids were added, and stirring was continued for an additional 15 minutes. The liquid of the mixture was removed by applying suction through a filter paper, after which 2-propyl alcohol was added as a lubricant to the solids in an amount to make 100 parts by weight (pbw) solids to 150 pbw 2-propyl alcohol. The PTFE composition thus made was compressed to form an extrusion billet and ram extruded at a reduction ratio of 22:1. The extruded PTFE composition was dried in an oven at 150° C. for 4 hours. The dried extruded article had a bulk density of 0.38 grams/cc, 6 mm diameter, and a composition of 60 wt. % activated carbon powder, 10 wt. % activated carbon fibers, 20 wt. % carbon black, and 10 wt. % PTFE.

The capacitor was assembled as follows:

A solution of 1 mol/liter tetraethyl ammonium tetrafluoroborate (($C_2H_5$)$_4$NBF$_4$) in propylene carbonate was prepared for use as an electrolyte. The solution was tested by Karl Fischer titration to ensure that the water content was less than 20 ppm.

A 1 mm thick electrode was cut from the extruded article described above, in a direction perpendicular to the extrusion direction. The electrode was placed on the inside bottom of an austenitic stainless steel casing having a diameter of about 14 mm. Before assembly, the casing and its cover, also stainless steel, had their interior surface covered with an electrically-conductive paste, and were then dried. The casing, with the electrode in place, was further dried under vacuum at a temperature of 150° C. for ten hours, after which they were moved to a nitrogen-filled dry box (dew point:—minus 50° C.) to prevent accumulation of moisture on the materials. The electrode was fully impregnated with the electrolyte described above. A disc (13 mm diameter—160 micrometers thick) of non-woven polypropylene fabric (TAPYRUS P050 FW-OCX, obtained from Tonen Papyrus Co., Ltd.) was placed on the electrode as a separator, and a second electrode, prepared in the same manner as the first, was placed on top of the separator to sandwich the separator between the electrodes. A polypropylene sealant was used to seal the casing cover to the casing. The capacitor was then tested as described above.

EXAMPLE 2

A capacitor was prepared as described in Example 1, except that the PTFE composition consisted of 70 wt. % non-acicular particles of coconut shell-based activated carbon (specific surface area—1500 $m^2$/gram), 20 wt. % of phenol-based carbon fibers, and 10 wt. % PTFE.

EXAMPLE 3

A capacitor was prepared as described in Example 1, except that the PTFE composition consisted of 70 wt. % non-acicular particles of coconut shell-based activated carbon (specific surface area—1500 $m^2$/gram), 10 wt. % of phenol-based carbon fibers, 10 wt. % carbon black, and 10 wt. % PTFE.

COMPARATIVE EXAMPLE 1

A capacitor was prepared as described in Example 1, except that the extruded article was formed into a sheet and the electrodes were cut from the sheet.

COMPARATIVE EXAMPLE 2

A capacitor was prepared as described in Example 1, except that no acicular particles were used; the PTFE composition consisted of 70 wt. % non-acicular particles of coconut shell-based activated carbon (specific surface area—1500 $m^2$/gram), 20 wt. % carbon black, and 10 wt. % PTFE.

TABLE 1

| | Activated Carbon Powder | Activated Carbon Fibers | Carbon Powder | PTFE | Electrostatic Capacity (F) | Impedance (Ohms) |
|---|---|---|---|---|---|---|
| Example 1 | 60 | 10 | 20 | 10 | 0.51 | 7.0 |
| Example 2 | 70 | 20 | | 10 | 0.54 | 7.5 |
| Example 3 | 70 | 10 | 10 | 10 | 0.51 | 7.3 |
| Comp. Ex. 1 | 60 | 10 | 20 | 10 | 0.48 | 11.0 |
| Comp. Ex. 2 | 70 | | 20 | 10 | 0.48 | 13.0 |

We claim:

1. In an electric double-layer capacitor consisting of
   (a) an open-top casing having at least one side and a bottom;
   (b) a porous layered electrode assembly disposed in said casing, said electrode assembly consisting of two layers of porous electrically-conductive electrode material having between them, in abutting relationship, a separator consisting of a layer of ion permeable material, said electrode material consisting of a porous polymeric matrix containing electrically-conductive particles;
   (c) a casing cover, said casing cover electrically-insulated from and sealed to said casing by a dielectric sealant material interposed between said cover and said casing; wherein one said electrode material layer is electrically-connected to said casing, and the other said electrode material layer is electrically-connected to said casing cover, and wherein said electrode assembly is impregnated with an electrolyte;
   the improvement wherein each of said porous electrically-conductive electrode material layers comprises a polytetrafluoroethylene composition at least containing acicular electrically-conductive particles, said acicular particles having a size and concentration in the polytetrafluoroethylene composition which is sufficient to provide directional orientation of said acicular particles by extrusion means, said acicular particles oriented in a direction approximately normal to the planar direction of said electrode material layer.

2. The electric double-layer capacitor as recited in claim 1 wherein said acicular electrically-conductive particles have an average diameter in the range 0.1 to 50 micrometers and a length in the range 1 to 1000 micrometers.

3. The electric double-layer capacitor as recited in claim 2 wherein said acicular electrically-conductive particles are selected from the group consisting of carbon particles and activated carbon particles.

4. The electric double-layer capacitor as recited in claim 3 wherein said acicular activated carbon particles are formed by carbonization and activation of fibers from the group consisting of phenol-based fibers, polyacrylonitrile fibers, and rayon-based fibers.

5. The electric double-layer capacitor as recited in claim 2 wherein said polytetrafluoroethylene composition further contains non-acicular electrically-conductive particles.

6. The electric double-layer capacitor as recited in claim 5 wherein said acicular and non-acicular electrically-conductive particles are selected from the group consisting of carbon particles and activated carbon particles.

7. The electric double-layer capacitor as recited in claim 6 wherein said acicular activated carbon particles are formed by carbonization and activation of fibers from the group consisting of phenol-based fibers, polyacrylonitrile fibers, and rayon-based fibers.

8. A process for making a double-layer capacitor as recited in claim 1 comprising the steps of
   (i) first preparing an electrode material comprising the steps of
      (a) mixing polytetrafluoroethylene resin together with, at least, acicular electrically-conductive particles to form a polytetrafluoroethylene composition;
      (b) lubricating the polytetrafluoroethylene composition with a lubricant;
      (c) extruding the lubricated polytetrafluoroethylene composition through a die having a tapered entry, thereby orienting said acicular particles in the extrusion direction and forming an elongated rod-shaped article;
      (d) cutting said rod-shaped article in the direction normal to the direction of extrusion to provide a first planar electrode and second planar electrode in the form of discs or plates wherein said acicular particles are oriented in a direction approximately normal to the planar direction of the electrode material;

(ii) interposing an ion-permeable material between said first and second planar electrodes to form an electrode assembly;

(iii) impregnating said electrode assembly with an electrolyte;

(iv) providing an open-top casing having a least one side and a bottom, and providing a casing cover;

(v) positioning said electrode assembly in said casing and providing an electrical connection between said first electrode and said casing;

(vi) positioning said casing cover in the casing above said electrode assembly and providing an electrical connection between said second electrode and said casing cover;

(vii) applying a dielectric sealant material between said casing and casing cover to electrically-insulate said casing from said casing cover, and to form a seal between said casing and said casing cover to complete assembly of the double-layer capacitor.

9. The process for making a double-layer capacitor as recited in claim 8, wherein said acicular electrically-conductive particles have an average diameter in the range 0.1 to 50 micrometers and a length in the range 1 to 1000 micrometers.

10. The process for making a double-layer capacitor as recited in claim 9, wherein said acicular electrically-conductive particles are selected from the group consisting of carbon particles and activated carbon particles.

11. The process for making a double-layer capacitor as recited in claim 10, further comprising the step of mixing non-acicular electrically-conductive particles with polytetrafluoroethylene resin and acicular electrically-conductive particles to form said composition.

12. The process for making a double-layer capacitor as recited in claim 11, wherein said acicular and non-acicular electrically-conductive particles are selected from the group consisting of carbon particles and activated carbon particles.

13. The process for making a double-layer capacitor as recited in claim 12, further comprising the step of stretching said rod-shaped article in the extrusion direction an amount in the range 1.1 to 5 times the original length of said article.

14. The process for making an electrode material as recited in claim 11, further comprising the step of stretching said rod-shaped article in the extrusion direction an amount in the range 1.1 to 5 times the original length of said article.

15. The process for making an electrode material as recited in claim 10, further comprising the step of stretching said rod-shaped article in the extrusion direction an amount in the range 1.1 to 5 times the original length of said article.

16. The process for making an electrode material as recited in claim 9, further comprising the step of stretching said rod-shaped article in the extrusion direction an amount in the range 1.1 to 5 times the original length of said article.

17. The process for making a double-layer capacitor as recited in claim 8, further comprising the step of stretching said rod-shaped article in the extrusion direction an amount in the range 1.1 to 5 times the original length of said article.

* * * * *